United States Patent
Yudovich

(10) Patent No.: US 7,293,835 B2
(45) Date of Patent: Nov. 13, 2007

(54) VEHICLE SEAT

(75) Inventor: Anthony Yudovich, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 483 days.

(21) Appl. No.: 11/031,882

(22) Filed: Jan. 7, 2005

(65) Prior Publication Data
US 2006/0152055 A1 Jul. 13, 2006

(51) Int. Cl.
*B60N 2/02* (2006.01)

(52) U.S. Cl. .................. 297/335; 296/65.05

(58) Field of Classification Search .......... 297/335, 297/334, 332, 333, 331; 296/65.05
See application file for complete search history.

(56) References Cited

U.S. PATENT DOCUMENTS

| | | | |
|---|---|---|---|
| 6,655,724 B1 | 12/2003 | Yoshino et al. | |
| 6,817,660 B2 * | 11/2004 | Ito et al. | 297/15 |
| 7,040,702 B2 * | 5/2006 | Yamada et al. | 297/331 |
| 2004/0056521 A1 * | 3/2004 | Kayumi et al. | 297/334 |
| 2006/0284464 A1 * | 12/2006 | Soditch et al. | 297/331 |

* cited by examiner

*Primary Examiner*—Milton Nelson, Jr.
(74) *Attorney, Agent, or Firm*—Dann, Dorfman, Herrell and Skillman, P.C.

(57) ABSTRACT

A vehicle seat includes a seat back supported to a body floor of a vehicle, a seat cushion pivotally supported to the seat back so as to be tipped up relative to the seat back, the seat cushion having at least one hole formed in a bottom surface thereof, a leg member penetrating the at least one hole of the bottom surface of the seat cushion at an upper end portion thereof and pivotally supported to a lower portion of the seat cushion so as to be folded relative the bottom surface of the seat cushion and laid on the bottom surface of the seat cushion, and stopper members for stopping the leg means and keeping the leg means vertically standing from the bottom surface of the seat cushion, the leg member being provided at the upper end thereof with at least one covering for concealing the at least one hole of the bottom surface of the seat cushion when the leg member is folded and laid on the bottom surface of the seat cushion.

33 Claims, 12 Drawing Sheets

VEHICLE SEAT

BACKGROUND OF THE INVENTION

1. Field of the Invention

The present invention relates to a vehicle seat in which a seat cushion of the vehicle seat is adapted to be tipped up relative to a seat back of the vehicle seat and, more particularly, to a vehicle seat in which a seat cushion of the vehicle seat has leg means pivotally supported to a lower portion thereof and the leg means is adapted to be folded and laid on a bottom surface of the seat cushion.

2. Description of the Related Art

As a vehicle seat, there has been proposed a vehicle seat in which a seat cushion of the vehicle seat can be tipped up relative to a seat back of the vehicle seat in order that any space can be obtained around the vehicle seat. U.S. Pat. No. 6,655,724 B1 assigned to the assignee of the present invention discloses this type of vehicle seat. The conventional vehicle seat includes a seat back supported to a floor of a vehicle body, and a seat cushion pivotally supported to the seat back. The seat cushion includes a seat cushion frame and a leg member having a body of a substantially U-shape in outline. The seat cushion has a pair of spaced apart holes formed in a bottom surface thereof. The leg member is pivotally supported to the seat cushion frame with an opening of the substantially U-shaped body thereof facing upwardly and with both end portions of the substantially U-shaped body thereof penetrating the spaced apart holes of the bottom surface of the seat cushion and being pivotally supported to the seat cushion frame. The leg member is releasably engaged with a holding device mounted on the floor of the vehicle body, whereby the vehicle seat is stably seated on the floor of the vehicle body.

When the seat cushion is tipped up relative to the seat back, the leg member is adapted to be disengaged from the holding device. The leg member is then folded so as to be laid on the bottom surface of the seat cushion by a person's hand. In a condition where the seat cushion is tipped up relative to the seat back, and the leg member is folded and then laid on the bottom surface of the seat cushion, the holes of the bottom surface of the seat cushion which the both end portions of the leg means penetrate are exposed on the bottom surface of the seat cushion. Therefore, a visual appearance of the seat cushion is deteriorated.

SUMMARY OF THE INVENTION

The present invention has been made in order to overcome the foregoing disadvantage.

It is therefore an object of the present invention to provide a vehicle seat that has a good visual appearance.

It is another object of the present invention to provide a vehicle seat in which a seat cushion of the vehicle seat can be automatically tipped up relative to a seat back of the vehicle seat.

It is still another object of the present invention to provide a vehicle in which a seat cushion of the vehicle seat is provided with leg means and can be automatically tipped up relative to a seat back of the vehicle seat, and the leg means is adapted to be operatively folded and then laid on a bottom surface of the seat cushion synchronously with the tipping-up movement of the seat cushion relative to the seat back.

In accordance with the present invention, there is provided a vehicle seat. The vehicle seat comprises a seat back supported to a body floor of a vehicle, a seat cushion pivotally supported to the seat back so as to be tipped up relative to the seat back, the seat cushion having at least one hole formed in a bottom surface thereof, leg means penetrating the at least one hole of the bottom surface of the seat cushion at an upper end portion thereof and pivotally supported to a lower portion of the seat cushion so as to be folded relative to the bottom surface of the seat cushion and laid on the bottom surface of the seat cushion, and stopper means for stopping the leg means and keeping the leg means vertically standing from the bottom surface of the seat cushion, the leg means being provided at the upper end portion thereof with at least one covering for concealing the at least one hole of the bottom surface of the seat cushion when the leg means is folded and laid on the bottom surface of the seat cushion.

The seat cushion may have the two spaced apart holes formed in the bottom surface thereof. The leg means may have a body of a substantially U-shape in outline. The substantially U-shaped body of the leg means is pivotally supported to the lower portion of the seat cushion with an opening thereof facing upwardly and with both end portions thereof penetrating the two spaced apart holes. The coverings are provided at the both end portions of the U-shaped body of the leg means.

The vehicle seat may include spring means for biasing the leg means in such a direction as to be away from the bottom surface of the seat cushion, and means for causing the leg means to be operatively folded and then laid on the bottom surface of the seat cushion against an action of the spring means, synchronously with the tipping-up movement of the seat cushion relative to the seat back.

The seat cushion may be pivotally supported at both sides thereof to the seat back by means of a pair of supporting shafts. The means for causing the leg means to be folded and then laid on the bottom surface of the seat cushion against the action of the spring means comprises a stationary pulley mounted on one of the supporting shafts and fixed on one of the both sides of the seat cushion, and a traction cable connected between the leg means and the stationary pulley, so that when the seat cushion is tipped up around the supporting shafts, the traction cable is synchronously pulled, whereby the leg means is folded and then laid on the bottom surface of the seat cushion against the action of the spring means.

The vehicle seat may include a compensator for compensating a pulling force that is exerted on the traction cable.

The body floor of the vehicle may have holding means mounted thereon. The leg means is adapted to be relesably engaged at a lower portion thereof with the holding means.

The vehicle seat may include means for causing the seat cushion to be automatically tipped up relative to the seat cushion, locking means for locking the seat cushion and preventing the tipping-up movement of the seat cushion, and releasing means for causing the seat cushion to be released from the locking means.

The bottom surface of the seat cushion may have a recess portion in which the leg means is to be received.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

A vehicle seat according to the present invention will be discussed hereinafter with reference to the accompanying drawings.

Figure 1:
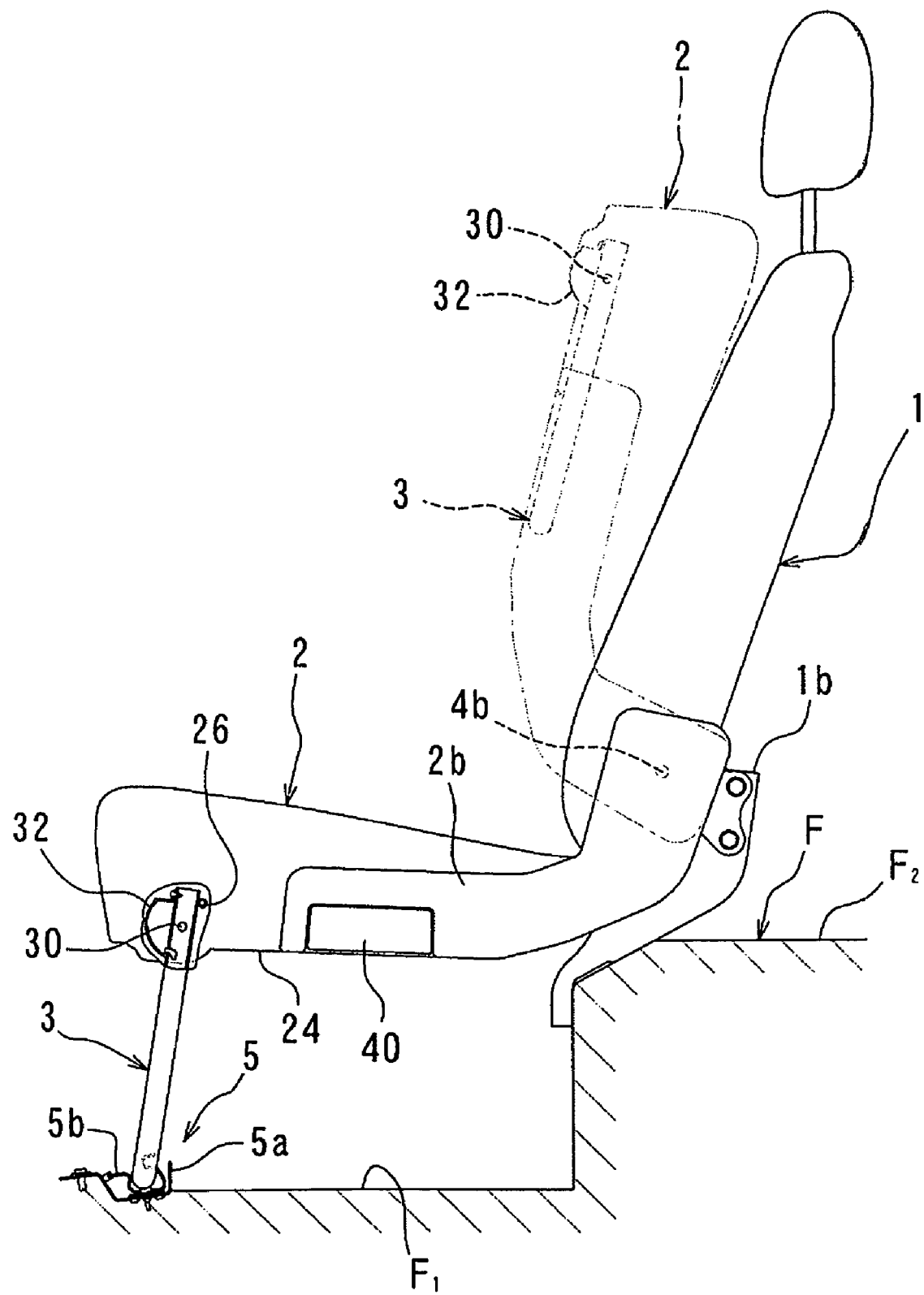
FIG. 1 is a schematic side view of a vehicle seat according to an embodiment of the present invention.

Referring now FIG. 1, there is illustrated a vehicle seat according to an embodiment of the present invention. The illustrated embodiment is applied to a rear seat for a vehicle, e.g., a pickup truck. The vehicle seat generally includes a seat back 1 supported to a floor F of a vehicle body, a seat cushion 2 pivotally supported to the seat back 1 so as to be tipped up relative to the seat back 1, leg means 3 pivotally supported to a lower portion of the seat cushion 2 so as to be folded and then laid on a bottom surface 24 of the seat cushion 2, and stopper means for stopping the leg means 3 and keeping the leg means 3 standing vertically from the bottom surface 24 of the seat cushion 2.

The floor F of the vehicle body has a lower step portion $F_1$ and an upper step portion $F_2$. A holding device 5 is mounted on the lower step portion $F_1$ of the vehicle body floor F. The holding device 5 comprises a base member 5a mounted on the lower step portion $F_1$ of the vehicle body floor F, and a receiving spring clip member 5b attached to the base member 5a. The base member 5a has a section of a substantially U-shape in cross-section and is mounted on the lower step portion $F_1$ of the vehicle body F with an opening of the substantially U-shaped section thereof facing upwardly. The receiving spring clip member 5b has the shape of an Ohm symbol in cross-section and is attached to the substantially U-shaped section of the base member 5a with an opening of the receiving spring clip member 5b facing upwardly. The leg means 3 is releasably engaged at a lower portion thereof with the receiving spring clip member 5b, whereby the seat cushion 2 is stably seated on the vehicle body floor F. When the seat cushion 2 is tipped up relative to the seat back 1, the receiving spring clip member 5b is deformed, whereby the leg means 3 can be easily disengaged from the receiving spring clip member 5b.

Figure 2:
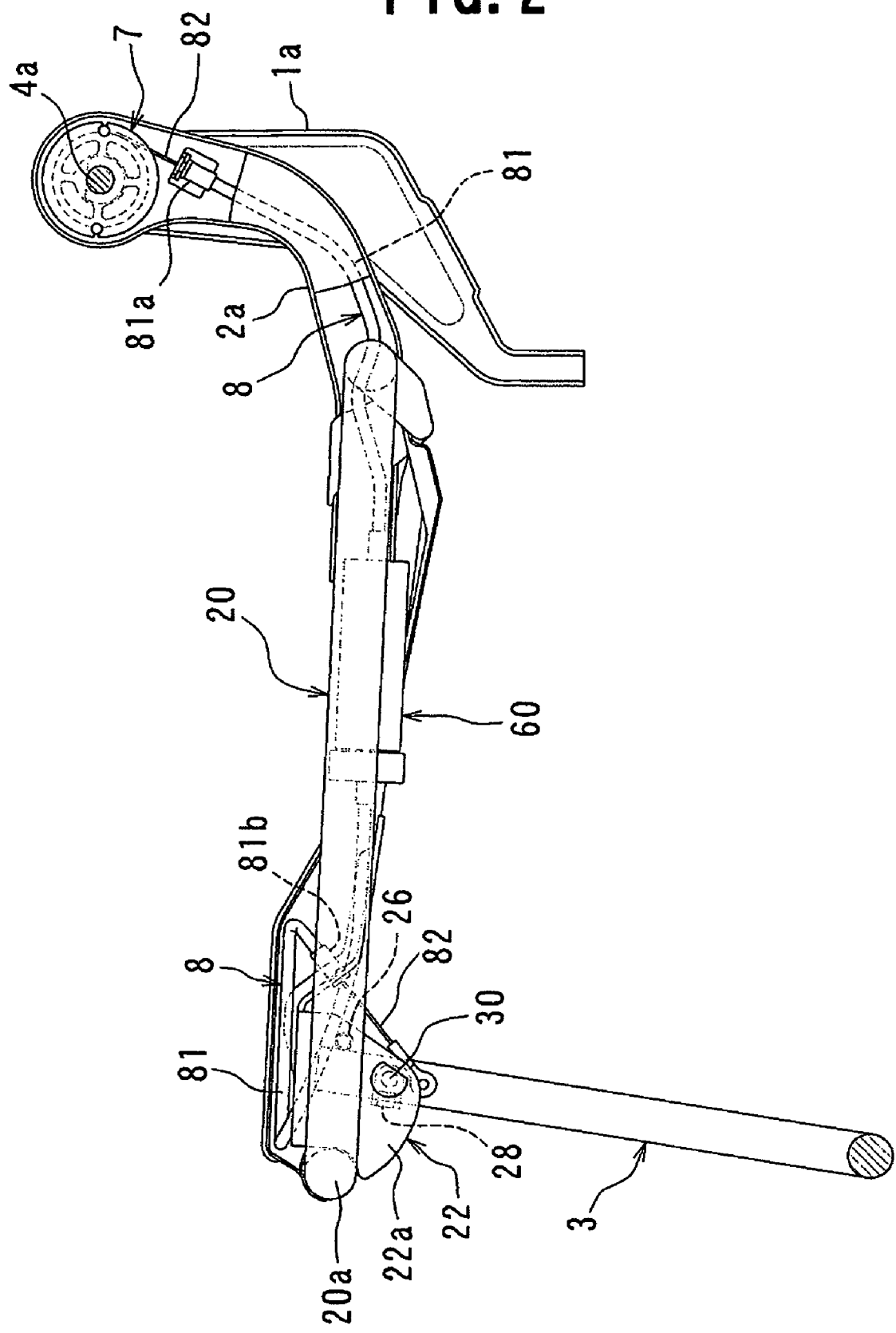
FIG. 2 is a schematic side view which is of assistance in explaining means for causing substantially U-shaped leg means to be operatively folded and laid on a bottom surface of a seat cushion of the vehicle seat.
Figure 3:
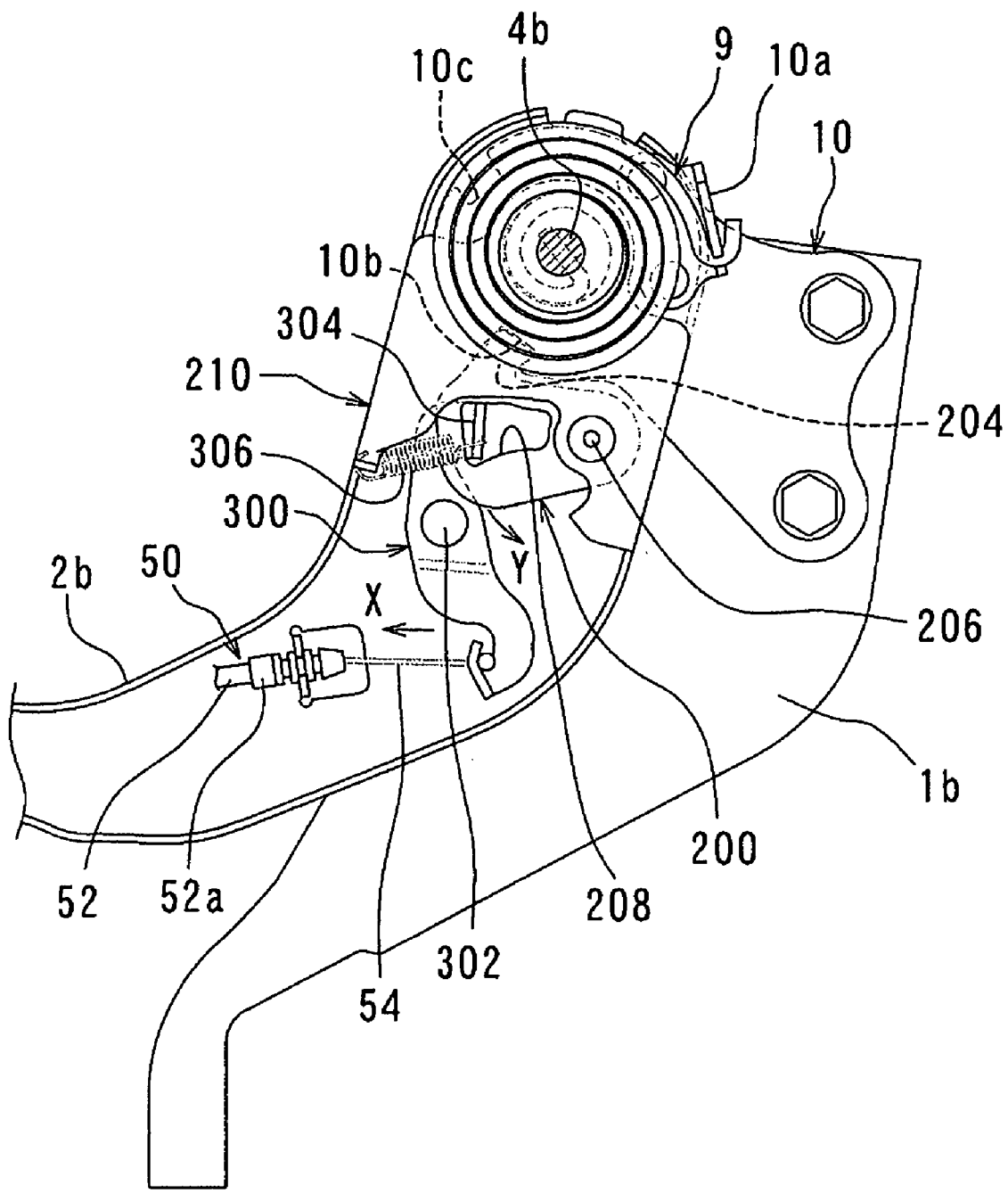
FIG. 3 is a schematic enlarged side view which is of assistance in explaining means for causing the seat cushion to be automatically tipped up relative to the seat cushion, locking means for locking the seat cushion and preventing the tipping-up movement of the seat cushion, and releasing means for releasing the seat cushion from the locking means.

Referring to FIGS. 2 and 3, the seat back includes a seat back frame (not shown) and a pair of first and second side brackets 1a, 1b (first side bracket 1a is shown in FIG. 2 and second side bracket 1b is shown in FIGS. 1 and 3) extending downwardly from both sides of the seat back frame. As shown in FIG. 1, the seat back 1 is supported to the upper step portion $F_2$ of the vehicle body floor F by means of the side brackets. The seat cushion includes a substantially ring-like seat cushion frame 20 of a substantially quadrilateral shape and a pair of first and second curved arms 2a, 2b (first curved arm 2a is shown in FIG. 2 and second curved arm 2b is shown in FIGS. 1 and 3) extending rearwardly from both sides of the seat cushion frame 20. The seat cushion is pivotally supported to the seat back by causing the curved arms 2a, 2b of the seat cushion to be disposed on the insides of the side brackets 1a, 1b and causing the curved arms 2a, 2b to be supported to the side brackets 1a, 1b of the seat back 1 by a pair of first and second supporting shafts 4a, 4b (first supporting shaft 4a is shown in FIG. 2 and second supporting shaft 4b is shown in FIGS. 1 and 3), so that the seat cushion can be pivoted around the supporting shafts 4a, 4b.

Figure 4:
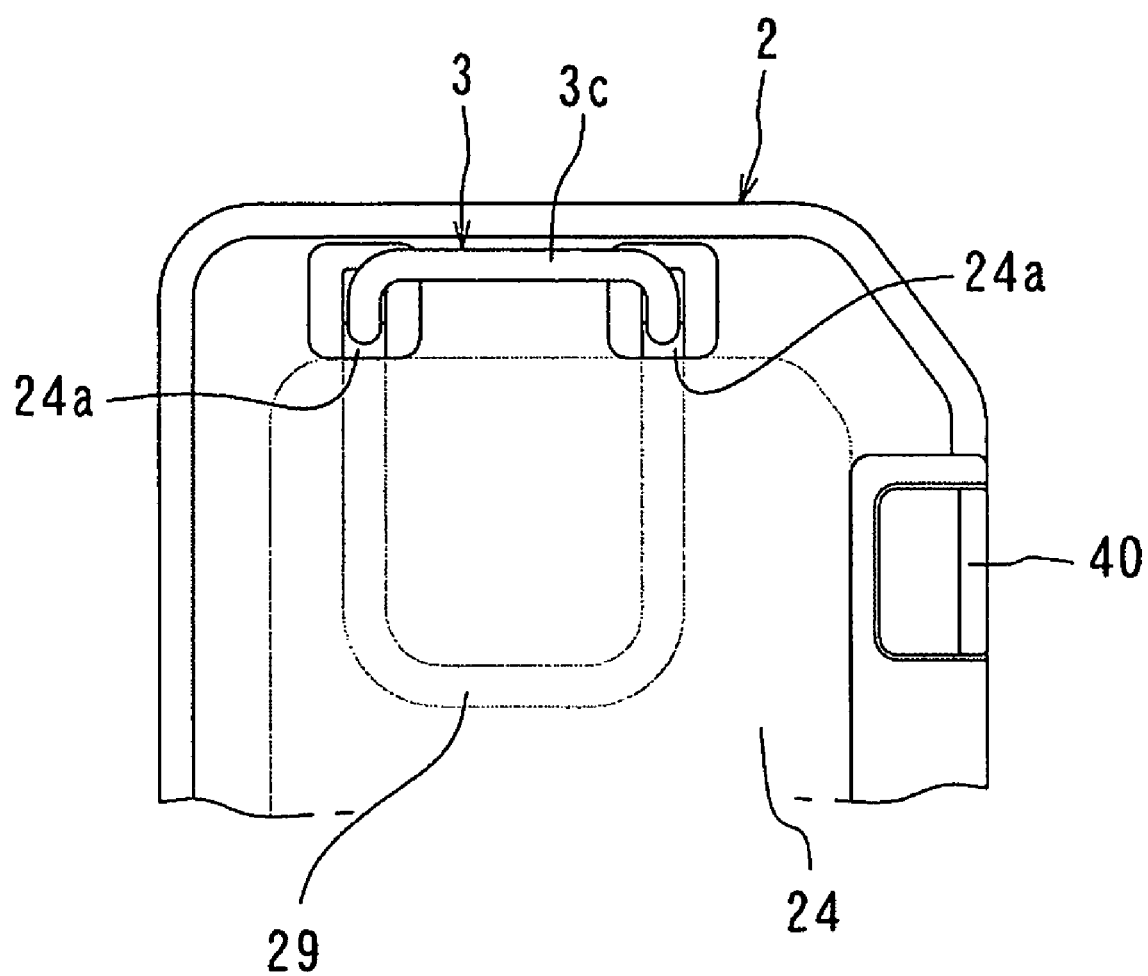
FIG. 4 is a schematic bottom view of the seat cushion in a condition where the vehicle seat is seated on a floor of a vehicle body.
Figure 5:
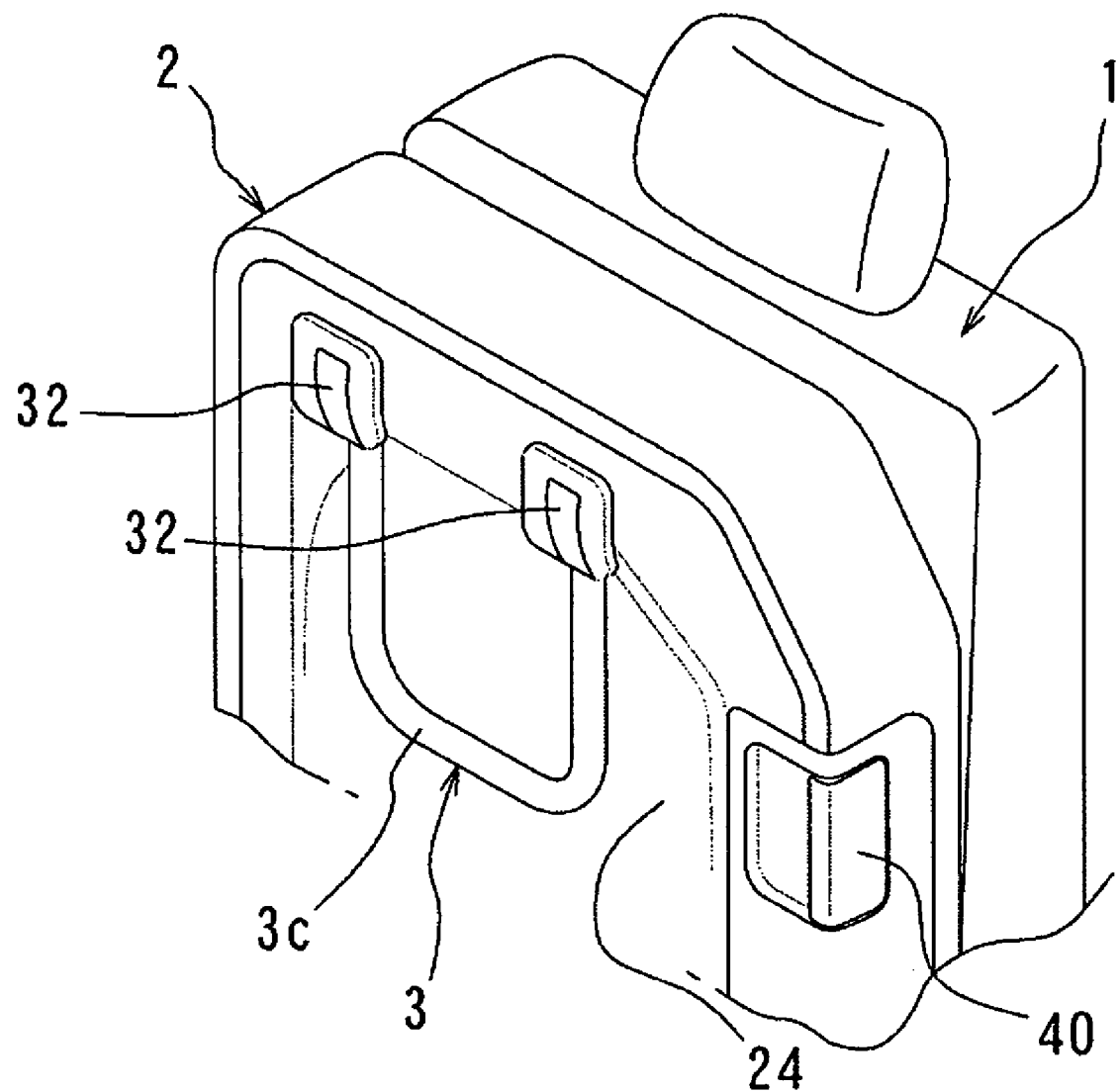
FIG. 5 is a schematic perspective view of the seat cushion in a condition where the seat cushion is tipped up relative to the seat back and the leg means is folded and laid on the bottom surface of the seat cushion.

Referring to FIGS. 4 and 5, the leg means 3 is formed into a substantially U-shape in outline by bending a metal round pipe into a substantially U-shape. The leg means has first and second end portions.

Figure 6:
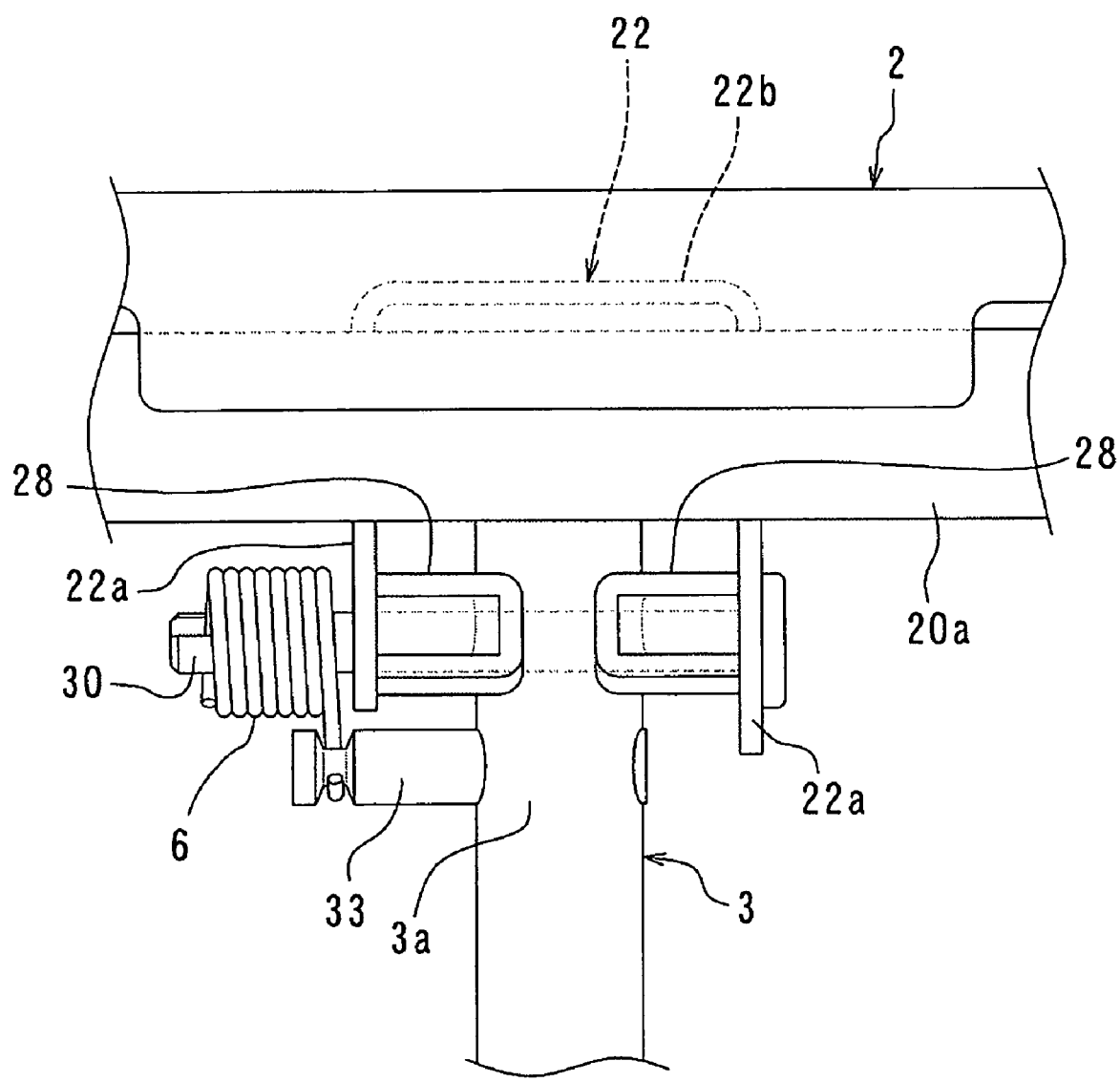
FIG. 6 is a schematic front view of the leg means pivotally supported to brackets of a seat cushion frame, in which coverings provided at first and second end portions of the leg means are removed for clarity of illustration.
Figure 7:
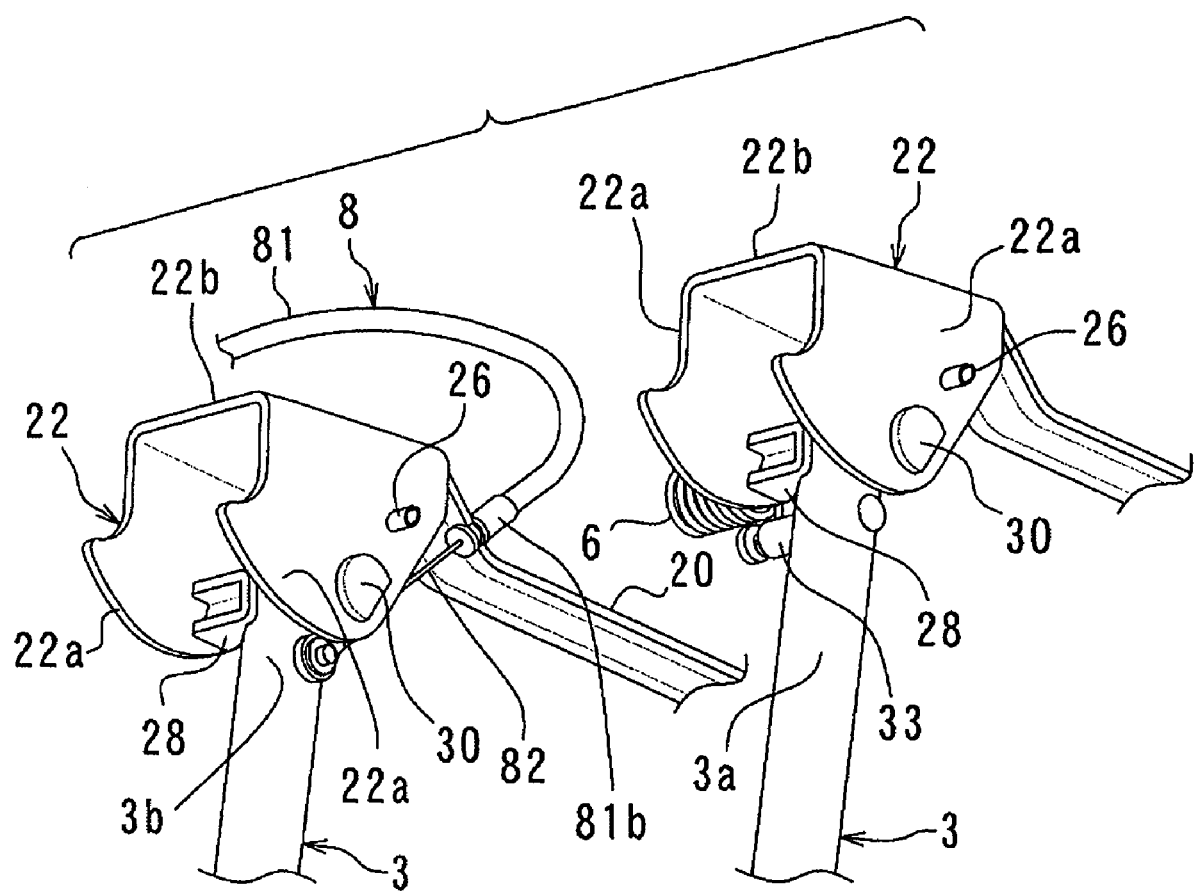
FIG. 7 is a schematic perspective view of the leg means pivotally supported to the brackets of the seat cushion frame, in which the coverings are removed for clarity of illustration.

Again referring to FIG. 2, and referring to FIGS. 6 and 7, the leg means 3 is pivotally supported to the seat cushion frame 20. More particularly, the seat cushion frame 20 has a pair of spaced apart brackets 22 of a substantially U-shape attached to a rear side of a front section 20a thereof. Each of the U-shaped brackets 22 comprises a pair of spaced apart side portions 22a and an intermediate portion 22b interconnecting the spaced apart portions 22a. The U-shaped bracket 22 is attached to the rear side of the front section 20a of the seat cushion frame 20 with an opening of the U-shaped bracket 22 facing downwardly. As shown in FIG. 4, the bottom surface 24 of the seat cushion 2 has spaced apart holes 24a formed in portions thereof which positionally correspond to the U-shaped brackets 22, and a substantially U-shaped recess portion 29 in which the leg means 3 is to be received or nested when the leg means 3 is folded and laid on the bottom surface 24 of the seat cushion 2. The substantially U-shaped leg means 3 is pivotally supported to the seat cushion frame 20 with an opening of the substantially U-shaped leg means 3 facing upwardly and with the first and second end portions 3a, 3b of the substantially U-shaped leg means 3 penetrating the holes 24a of the bottom surface 24, received in the U-shaped brackets 22 and connected to the brackets 22 by means of supporting pins 30 penetrating the spaced apart side portions 22a of the brackets 22.

Figure 8:
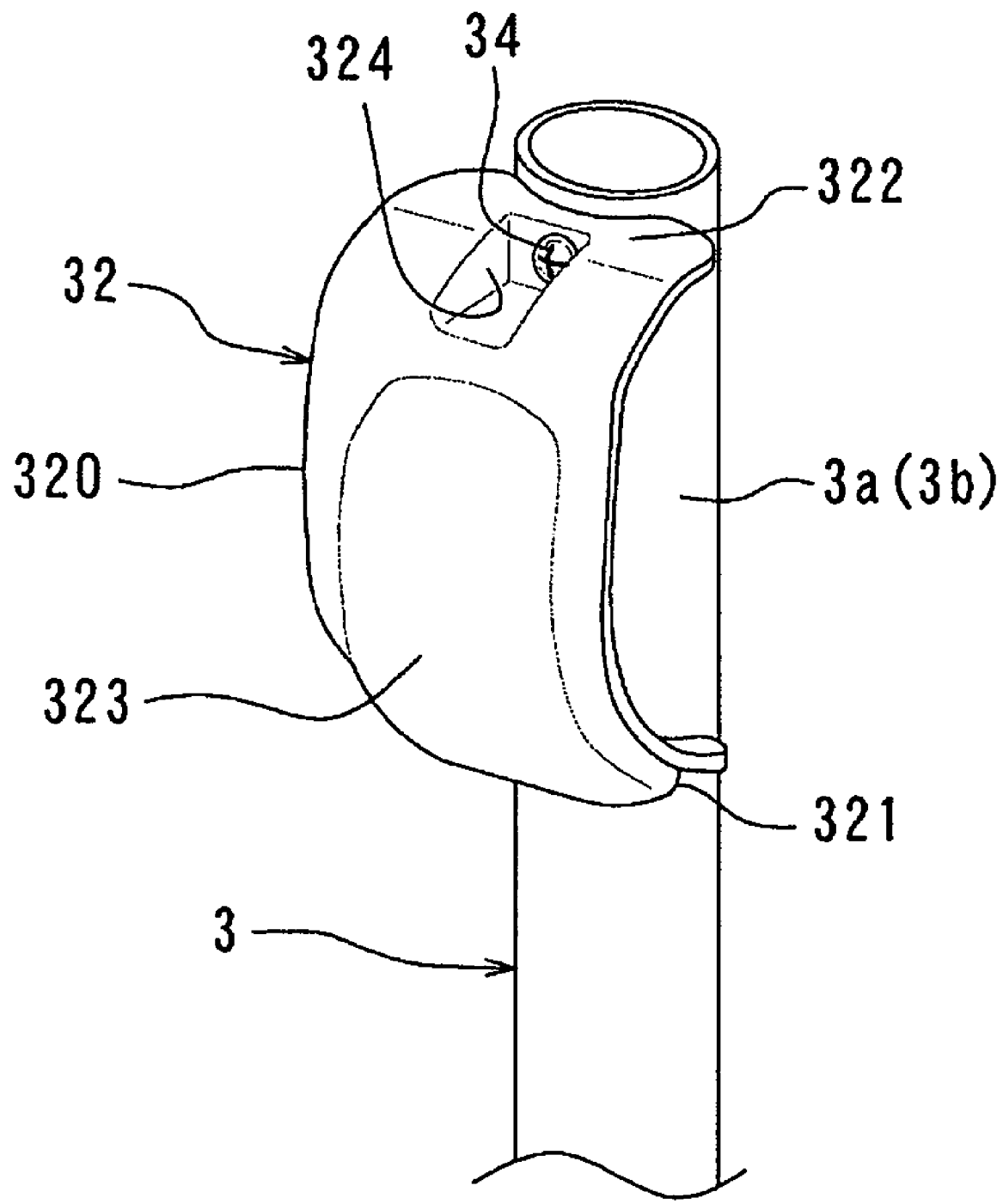
FIG. 8 is a schematic perspective view of the covering provided at each of the first and second end portions of the U-shaped leg means.
Figure 9:
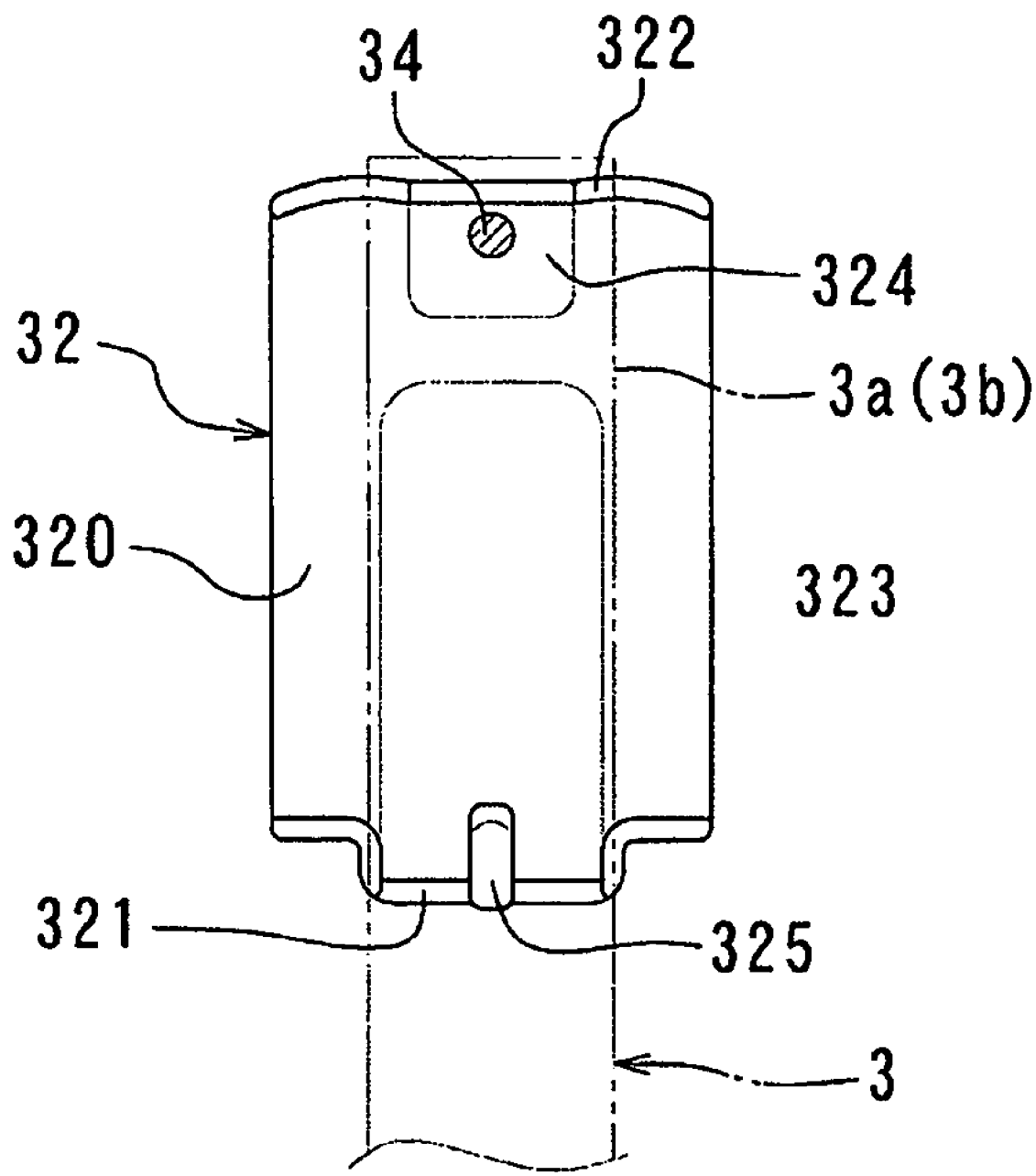
FIG. 9 is a schematic rear side view of the covering.

Again referring to FIGS. 1 and 5, and referring to FIGS. 8 to 11, the leg means 3 is provided at the first and second end portions 3a, 3b thereof with coverings 32 for concealing the openings 24a of the bottom surface 24 of the seat cushion 2. As shown in FIGS. 8 and 9, each of the coverings 32 comprises a substantially strip-like body 320 that is formed into a substantially C-shape in vertical section. The strip-like body 320 has first and second end portions 321, 322, an embossed portion 323 projecting outward from a portion of the strip-like body 320 which extends from a substantially middle area of the strip-like body 320 toward the first end portion 321 of the strip-like body 320, a recess portion 324 projecting inward at the second end portion 322, and an elastic engaging piece 325 provided at the first end portion 321. The coverings 32 are provided at the first and second end portions 3a, 3b of the leg means 3 with the recess portions 324 thereof being fastened to the first and second end portions 3a, 3b by means of screws 34 and with the elastic engaging pieces 325 thereof being engaged with holes 3d (FIGS. 10 and 11) that are formed in the first and second end portions 3a, 3b of the substantially U-shaped leg means 3.

Figure 10:
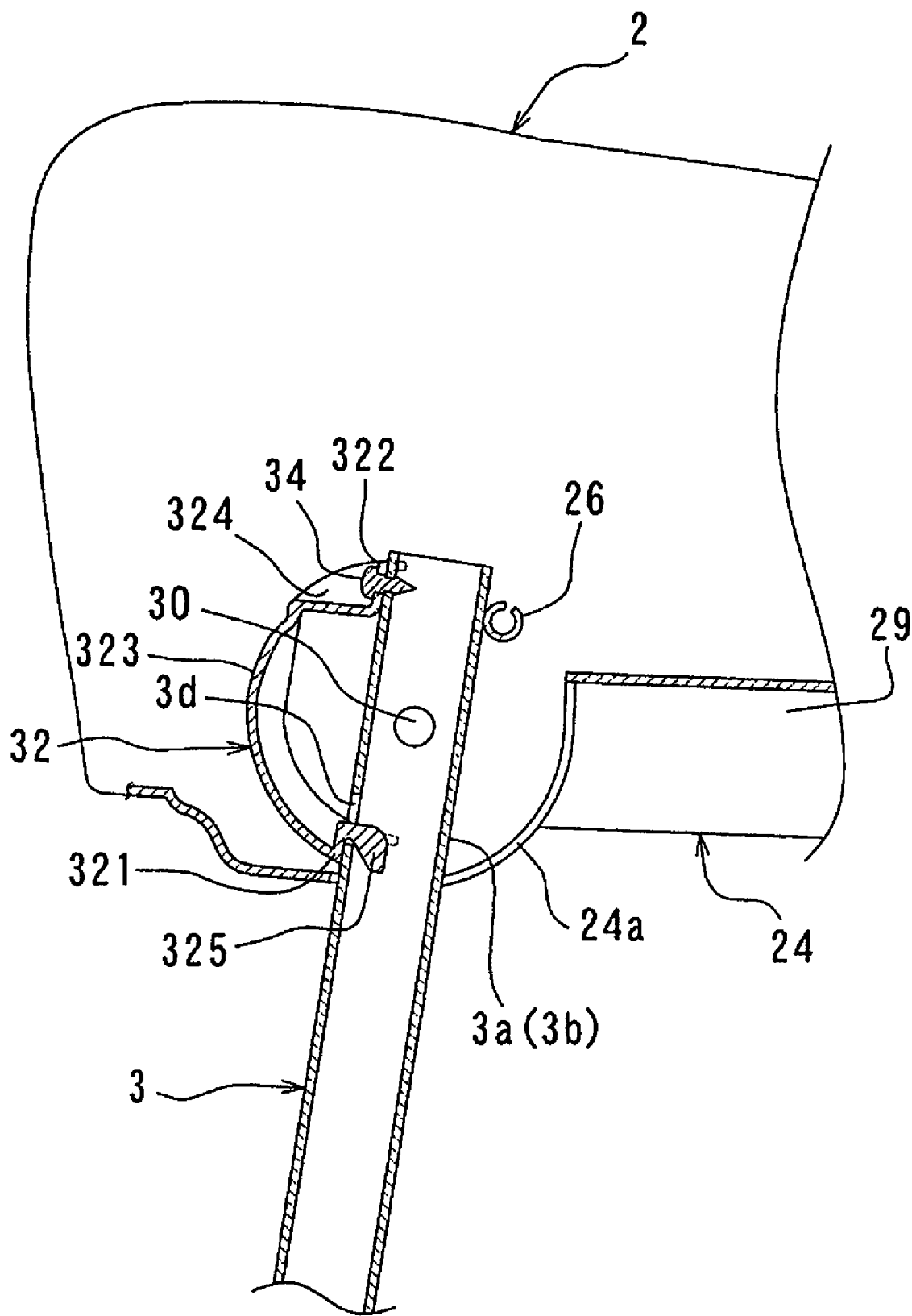
FIG. 10 is a schematic enlarged side sectional view showing a condition where the seat cushion is seated on the floor of the vehicle body and spaced apart holes formed in the bottom surface of the seat cushion are exposed on the bottom surface of the seat cushion.
Figure 11:
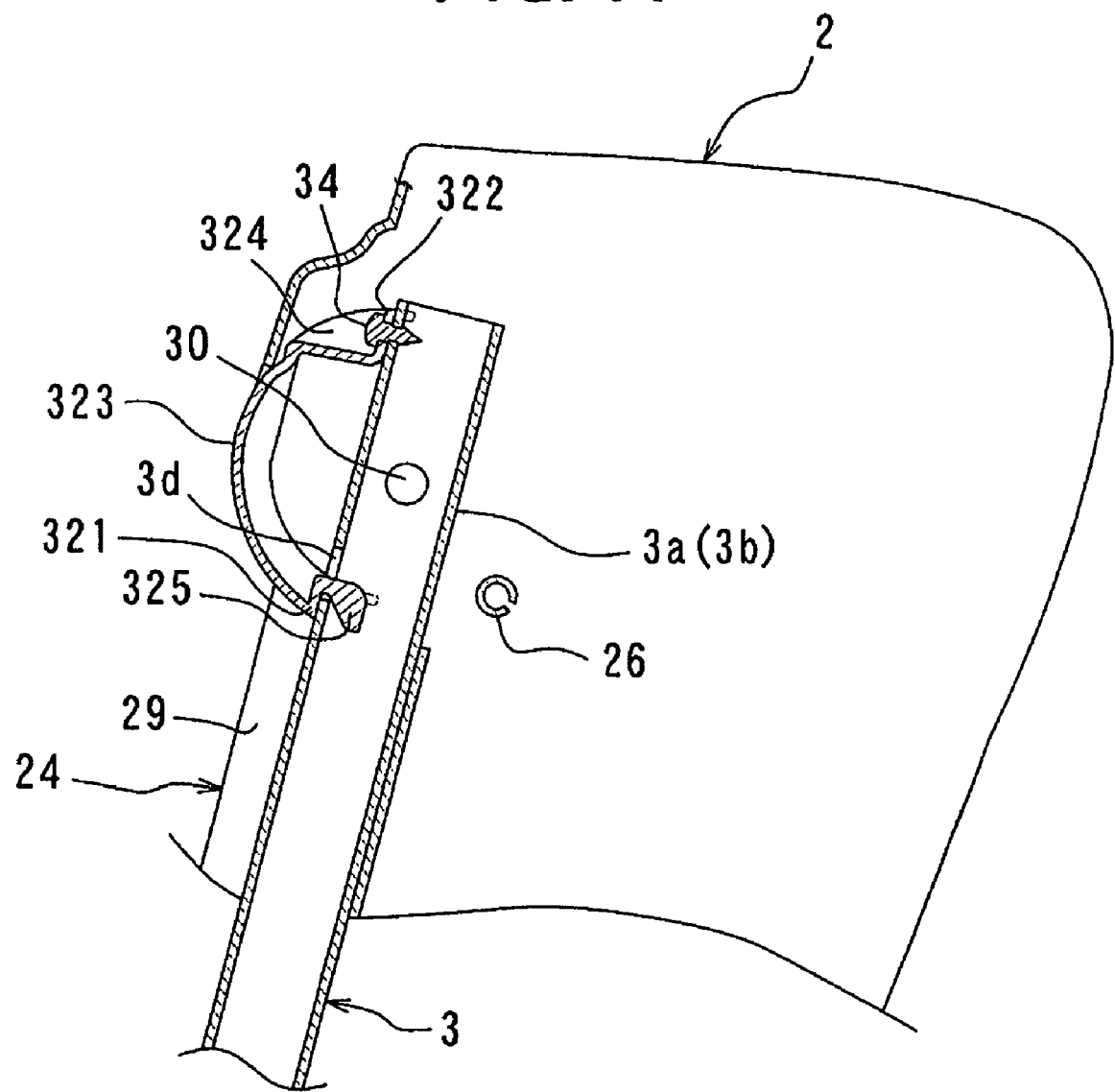
FIG. 11 is a schematic enlarged side sectional view showing a condition where the seat cushion is tipped up relative to the seat back and the spaced apart holes of the bottom surface of the seat cushion are concealed with the coverings provided at the leg means.

In a condition where the vehicle seat is seated on the floor F of the vehicle body with the leg means 3 being releasably engaged with the holding device 5 as shown in FIGS. 1, 5 and 10, the holes 24a formed in the bottom surface 24 of the seat cushion 2 are exposed on the bottom surface 24 of the seat cushion. In this condition, since the bottom surface 24 of the seat cushion 2 faces the floor F of the vehicle body, the holes 24a formed in the bottom surface 24 of the seat cushion 2 do not attract a person's attention. When the seat cushion 2 is tipped up relative to the seat back 1 as shown in FIG. 1 by a broken line and shown in FIGS. 5 and 11, the bottom surface 24 of the seat cushion 2 will attract the person's attention. However, as the leg means 3 is pivoted around the supporting shafts 30 in such a direction as to approach the bottom surface 24 of the seat cushion 2, the holes 24a formed in the bottom surface 24 of the seat cushion 2 become concealed by the coverings 32. When the leg means 3 is laid on the bottom surface 24 of the seat cushion 2 and then received in the U-shaped recess portion 29 of the bottom surface 24 of the seat cushion 2 as shown in FIGS. 5 and 11, the holes 24a formed in the bottom surface 24 of the seat cushion 2 are perfectly concealed by the coverings 32. Therefore, according to the present invention, it is possible to provide the vehicle seat that has a good visual appearance.

While the leg means 3 is formed into a substantially U-shape in outline as discussed above, the shape of the leg means 3 is not limited to the substantially U-shape. The leg means 3 may be formed into, for example, a substantially L-shape in outline. In this case, only one hole is formed in the bottom surface 24 of the seat cushion 1, the substantially L-shaped leg means is pivotally supported to the seat cushion frame by causing an upper end portion thereof to penetrating the hole of the bottom surface 24 of the seat cushion 2, and only one covering is provided at the upper end portion of the substantially L-shaped leg means.

The illustrated embodiment according to the present invention further includes means for causing the seat cushion 1 to be automatically tipped up relative to the seat back 1, locking means for locking the seat cushion 2 and preventing the seat cushion 2 from being tipped up relative to the seat back 2, releasing means for causing the seat cushion 2 to be released from the locking means, spring means for biasing the leg means 3 in such a direction as to be away from the bottom surface of the seat cushion 2, and means for causing the leg means 3 to be operatively folded and then laid on the bottom surface of the seat cushion 2 against an action of the spring means, synchronously with the tipping-up movement of the seat cushion 2 relative to the seat back 1.

As shown in FIGS. 6 and 7, the spring means for biasing the leg means 3 comprises a coil spring 6 mounted around one of the supporting pins 30 supporting the leg means 3. The first end portion 3a of the U-shaped leg means 3, which is supported to the corresponding bracket 22 by the supporting pin 30 around which the coil spring 6 is mounted, is provided with a protruding pin 33 projecting radially from the first end portion 3a of the U-shaped leg means 3. One end of the coil spring 6 is fastened to the protruding pin 33 of the leg means 3, whereby the leg means 3 is always urged in such a direction as to be away from the bottom surface of the seat cushion 2.

The stopper means for stopping the leg means 3 against the action of the coil spring 6 comprises stopper pins 26 penetrating the spaced apart side portions 22a of the U-shaped brackets 22. The first and second end portions 3a, 3b of the U-shaped leg means 3 are abutted against the stopper pins 26, whereby the leg means 3 is kept in a vertically standing state relative to the bottom surface of the seat cushion 2 against the action of the coil spring 6. Incidentally, spacer members 28 are disposed between one of the spaced apart side portions 22a of each of the brackets 22 and the corresponding end portion of the U-shaped leg member 3, and between the other of the spaced apart side portions 22a of each of the brackets 22 and the corresponding end portion of the U-shaped leg member 3, and mounted on the corresponding supporting shaft 30. Due to the presence of the spacer members 28, the leg means 3 can be smoothly pivoted without swaying laterally.

While the coil spring 6 is mounted around the one of the supporting pins 30 and the protruding pin 33 is provided at the first end portion 3a of the U-shaped leg means 3 in the illustrated example, the coil springs 6 may be mounted around the both supporting pins 30, the protruding pins 33 may be provided at the both end portions 3a, 3b of the leg means 3, and ends of the coil springs 6 may be fastened to the protruding pins 33.

When the leg means 3 is operatively folded and then laid on the bottom surface 24 of the seat cushion 2 synchronously with the tipping-up of the seat cushion, the leg means 3 is nested in the substantially U-shaped recess portion 29 as shown in FIG. 1 by the broken line and shown in FIGS. 5 and 11. Incidentally, in the condition where the vehicle seat is seated on the floor of the vehicle body, the U-shaped leg means 3 is engaged at the lower portion 3c thereof with the receiving spring clip member 5b of the holding device 5.

Again referring to FIGS. 2 and 7, the means for causing the leg means 3 to be operatively folded and then laid on the bottom surface of the seat cushion comprises a stationary pulley 7 and a traction cable 8 coupled between the stationary pulley 7 and the second end portion 3b of the U-shaped leg means 3. More particularly, the stationary pulley 7 is fixed on an inner surface of the first curved arm 2a of the seat cushion and mounted on the first supporting shaft 4a supporting the first curved arm 2a. The traction cable 8 comprises a tube 81 and a wire 82 inserted through the tube 81. The tube 81 of the traction cable 8 has first and second tube heads 81a, 81b provided at both end portions thereof. The first tube head 81a and the second tube head 81b are fixed on a portion of the first arm 2a of the seat cushion which is adjacent the pulley 7, and a portion of the seat cushion frame 20 which is adjacent the brackets 22 supporting the U-shaped leg means 3, respectively. One end portion of the wire 82 which projects from the first tube heads 81a is wound around the stationary pulley 7 and fastened to the stationary pulley 7. The other end portion of the wire 82 which projects from the second tube head 81b is coupled to the second end portion 3b of the U-shaped leg means 3.

Figure 12:
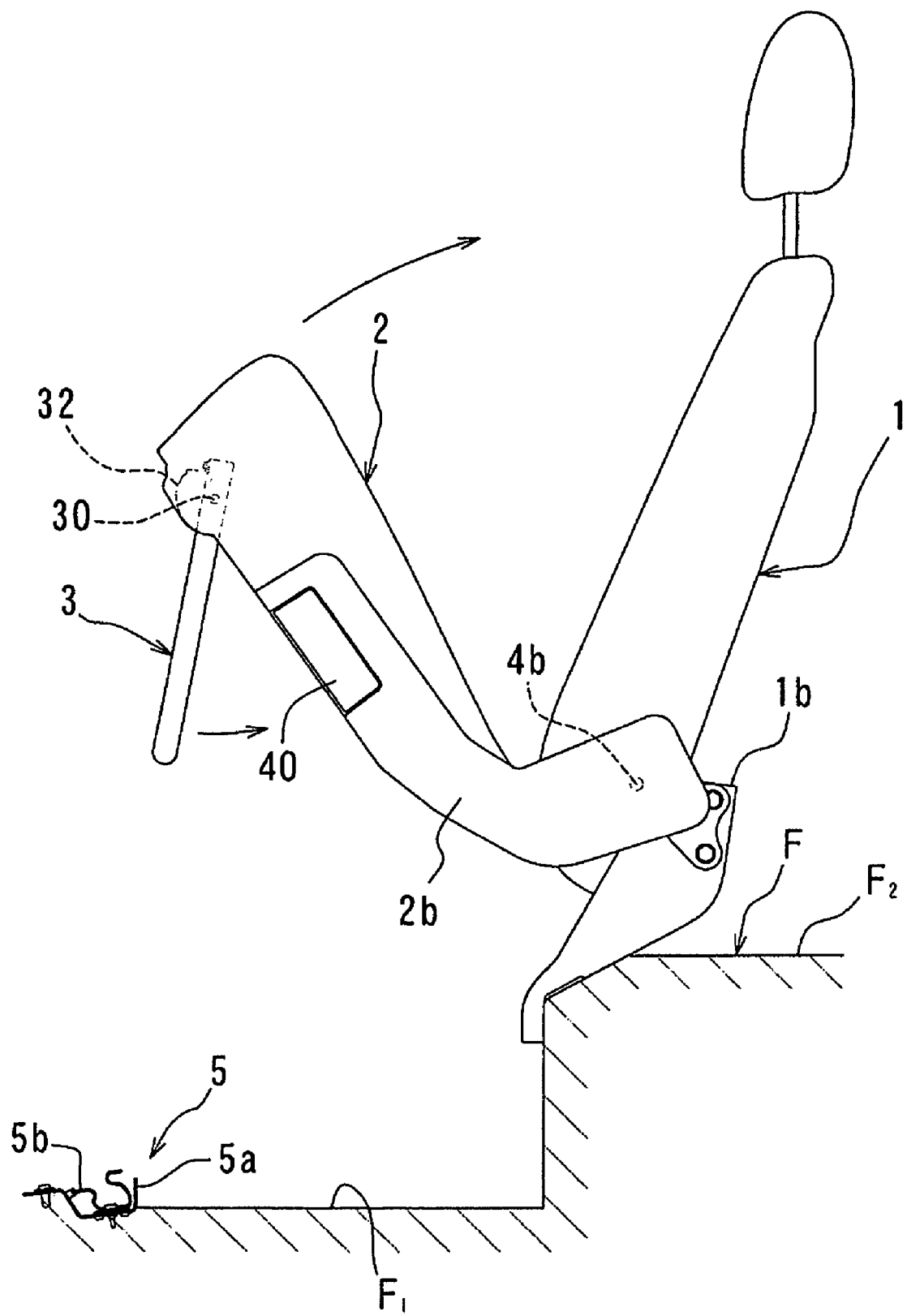
FIG. 12 is a schematic side view of the vehicle seat in which the seat cushion is being tipped up.

When the seat cushion is tipped up around the first and second supporting shafts 4a, 4b, the wire 82 of the traction cable 8 is pulled, whereby the leg means 3 is synchronously pivoted in such a direction as to approach the bottom surface of the seat cushion against the action of the coil spring 6 as shown in FIG. 12, then laid on the bottom surface of the seat cushion and received in the U-shaped recess portion 29 of the bottom surface of the seat cushion as shown in FIG. 1 by the broken line and shown in FIGS. 5 and 11.

Again referring to FIG. 3, the means for causing the seat cushion to be automatically tipped up relative to the seat cushion comprises a spiral spring 9 wound around the second supporting shaft 4b. An innermost end of the spiral spring 9 is fastened to the second supporting shaft 4b. An outermost end of the spiral spring 9 is fastened to a rising pieces 10a rising up from a protruding plate 10 which will be discussed in greater detail hereinafter. Due to an action of the spiral spring 9, the seat cushion is always biased in such a direction as to be tipped up relative to the seat cushion.

The locking means for locking the seat cushion and preventing the seat cushion from being tipped up comprises cooperating means on the second side bracket 1b of the seat back and the second curved arm 2b of the seat cushion. More particularly, the cooperating means comprises the protruding plate 10 provided at the second bracket 1b of the seat back and projecting toward the second curved arm 2b, the protruding plate 10 having two spaced apart engaging notches 10b, 10c, and a swinging plate 200 pivotally supported to the inner surface of the second curved arm 2b, the winging plate 200 having an engaging pawl portion 204 which is releasably engaged with any one of the engaging notches 10b, 10c.

The protruding plate 10 has a substantially circular section mounted on the second supporting shaft 4b. The engaging notches 10b, 10c are disposed around a peripheral edge of the substantially circular section of the protruding plate 10. The swinging plate 200 is disposed on a portion of the second curved arm 2b which is adjacent the substantially circular section of the protruding plate 10, and pivotally supported to the second curved arm 2b by means of a supporting pin 206. The swinging plate 200 is formed with an elongated hole 208 in a substantially central portion thereof. The engaging pawl portion 204 of the swinging plate 200 is releasably engaged with any one of the engaging notches 10b, 10c of the protruding plate 10, whereby the pivotal movement of the seat cushion relative to the seat back is prevented. Incidentally, the swinging plate 200 is interposed between the second curved arm 2b and an applying plate 210 mounted on the second supporting shaft 4b and fixed to the second curved arm 2b of the seat cushion.

The releasing means for causing the seat cushion to be released from the locking means includes a swinging lever 300 for causing the engaging pawl portion 204 of the swinging plate 200 to be released from any one of the engaging notches 10b, 10c. The swinging lever 300 is pivotally supported to the inner surface of the second curved arm 2b of the seat cushion by a supporting pin 302, and has a rising piece 304 rising up from one end thereof. The rising piece 304 of the swinging lever 300 is engaged with the elongated hole 208 of the swinging plate 200. A spring 306 is stretched between the covering plate 210 and the rising piece 304 of the swinging lever 300.

A second cable 50 is coupled between the swinging lever 300 and a releasing lever 40 (see FIGS. 1, 4 and 5) provided at a lower and side portion of the seat cushion 2. More particularly, the second cable 50 comprises a second tube 52 and a second wire 54 inserted through the second tube 52. The second tube 52 has third tube heads 52a provided at both ends thereof (only one third tube head 52a is shown in FIG. 3). One of the third tube heads 52a is supported to the second curved arm 2b of the seat cushion as shown in FIG. 3. The other of the third tube heads 52a is supported to the seat cushion frame. As shown in FIG. 3, one end of the second wire 54 which projects from the one of the third tube heads 52a is coupled to the other end of the swinging lever 300. The other end of the second wire 54 which projects from the other of the third tube heads 52a is coupled to the releasing lever 40.

When the releasing lever 40 is pulled by the person, the swinging lever 300 is pivoted around the supporting pin 302 in such a direction as indicated in FIG. 3 by an arrow X against an action of the spring 306. At this time, the rising piece 304 of the swinging lever 300 is moved relative to the elongated hole 208 of the swinging plate 200 while causing the swinging plate 200 to be pivoted around the supporting pin 206 in such a direction as indicated in FIG. 3 by an arrow Y, whereby the engaging pawl portion 204 of the swinging plate 200 is disengaged from one of the notches 10b, 10c with which the engaging pawl 204 of the swinging plate 200 has been engaged until now. Thus, the seat cushion is released from the locking means and can be automatically tipped up relative to the seat back. Synchronously with the tipping-up of the seat cushion, the leg means 3 is pivoted toward the bottom surface of the seat cushion 2 against the action of the coil spring 6, then laid on the bottom surface of the seat cushion 2 and received in the substantially U-shaped recess portion of the seat cushion.

Incidentally, in the condition where the leg means 3 is received in the recess portion 29 (FIGS. 4 and 11) of the bottom surface 24 of the seat cushion 2 as shown in FIG. 1 by the broken line and shown in FIG. 5, there is a possibility that the leg means 3 is mistakenly forcedly pulled out of the recess portion 29 of the bottom surface 24 of the seat cushion by the person. When the leg means 3 is forcedly pulled, the first wire 82 of the first traction cable 8 (FIG. 2) may be broken. In order to avoid this problem, a compensator 60 for compensating a pulling force exerted on the first wire 82 by the forcedly pulling of the leg means 3 may be employed as shown in FIG. 2. The compensator 60 is secured to the seat cushion frame 20. The first wire 82 of the first traction cable 8 passes directly through the compensator 60. In this case, even if the leg means 3 is forcedly pulled by the person, the pulling force can be positively compensated by the compensator, so that there is no possibility that the first wire 82 of the first traction cable 8 will be broken by the forcedly pulling of the leg means 3. In addition, even if the first wire 82 has an excessive length, the length of the wire can be compensated by the compensator 60. Therefore, even if the wire has an excessive length, the U-shaped leg means 3 can positively pivoted toward the bottom surface of the seat cushion and then received in the U-shaped recess portion of the bottom surface of the seat cushion. Incidentally, as the compensator, there may be employed any suitable conventional compensator.

While the seat cushion is adapted to be automatically tipped up relative to the seat back and the leg means is adapted to be operatively folded and laid on the bottom surface of the seat cushion synchronously with the tipping-up movement of the seat cushion in the illustrated example, the present invention may be applied to a vehicle seat in which a seat cushion of the vehicle seat is adapted to be tipped up relative to a seat back by the person's hand and leg means is adapted to be pivoted by the person's hand.

These and other advantages of the present invention will be apparent to those skilled in the art from the foregoing specification. Accordingly, it will be recognized by those skilled in the art that changes or modifications may be made to the above-described embodiment without departing from the broad inventive concepts of the invention. It should therefore be understood that this invention is not limited to the particular embodiment described herein, but is intended to include all changes and modifications that are within the scope and spirit of the invention as set forth in the claims.

What is claimed is:

1. A vehicle seat comprising:
a seat back supported to a body floor of a vehicle;
a seat cushion pivotally supported to said seat back so as to be tipped up relative to said seat back;
said seat cushion having at least one hole formed in a bottom surface thereof;
leg means penetrating said at least one hole of said bottom surface of said seat cushion at an upper end portion thereof and pivotally supported to a lower portion of said seat cushion so as to be folded relative to said bottom surface of said seat cushion and laid on said bottom surface of said seat cushion; and
stopper means for stopping said leg means and keeping said leg means vertically standing from said bottom surface of said seat cushion;
said leg means being provided at said upper end portion thereof with at least one covering for concealing said at least one hole of said bottom surface of said seat cushion when said leg means is folded and laid on said bottom surface of said seat cushion.

2. A vehicle seat according to claim 1, further including means for causing said seat cushion to be automatically tipped up relative to said seat cushion, locking means for locking said seat cushion and preventing the tipping-up movement of said seat cushion, and releasing means for causing said seat cushion to be released from said locking means.

3. A vehicle seat according to claim 1, wherein said bottom surface of said seat cushion has a recess portion in which said leg means is to be received.

4. A vehicle seat according to claim 1, wherein said body floor of said vehicle has holding means mounted thereon, said leg means being adapted to be relesably engaged at a lower portion thereof with said holding means.

5. A vehicle seat according to claim 4, further including means for causing said seat cushion to be automatically tipped up relative to said seat cushion, locking means for locking said seat cushion and preventing the tipping-up movement of said seat cushion, and releasing means for causing said seat cushion to be released from said locking means.

6. A vehicle seat according to claim 1, wherein said seat cushion has two said holes spaced apart and formed in said bottom surface thereof and said leg means has a body of a substantially U-shape in outline, said substantially U-shaped body of said leg means being pivotally supported to said lower portion of said seat cushion with an opening thereof facing upwardly and with both end portions thereof penetrating said two spaced apart holes, said coverings being provided at said both end portions of said U-shaped body of said leg means.

7. A vehicle seat according to claim 6, further including means for causing said seat cushion to be automatically tipped up relative to said seat cushion, locking means for locking said seat cushion and preventing the tipping-up movement of said seat cushion, and releasing means for causing said seat cushion to be released from said locking means.

8. A vehicle seat according to claim 6, wherein said body floor of said vehicle has holding means mounted thereon, said leg means being adapted to be relesably engaged at a lower portion thereof with said holding means.

9. A vehicle seat according to claim 8, further including means for causing said seat cushion to be automatically tipped up relative to said seat cushion, locking means for locking said seat cushion and preventing the tipping-up movement of said seat cushion, and releasing means for causing said seat cushion to be released from said locking means.

10. A vehicle seat according to claim 6, further including spring means for biasing said leg means in such a direction as to be away from said bottom surface of said seat cushion, and means for causing said leg means to be operatively folded and then laid on said bottom surface of said seat cushion against an action of said spring means, synchronously with the tipping-up movement of said seat cushion relative to said seat back.

11. A vehicle seat according to claim 10, further including means for causing said seat cushion to be automatically tipped up relative to said seat cushion, locking means for locking said seat cushion and preventing the tipping-up movement of said seat cushion, and releasing means for causing said seat cushion to be released from said locking means.

12. A vehicle seat according to claim 10, wherein said body floor of said vehicle has holding means mounted thereon, said leg means being adapted to be relesably engaged at a lower portion thereof with said holding means.

13. A vehicle seat according to claim 12, further including means for causing said seat cushion to be automatically tipped up relative to said seat cushion, locking means for locking said seat cushion and preventing the tipping-up movement of said seat cushion, and releasing means for causing said seat cushion to be released from said locking means.

14. A vehicle seat according to claim 10, wherein said seat cushion is pivotally supported at both sides thereof to said seat back by means of a pair of supporting shafts, and said means for causing said leg means to be operatively folded and then laid on said bottom surface of said seat cushion against the action of said spring means comprises a stationary pulley mounted on one of said supporting shafts and fixed on one of said both sides of said seat cushion, and a traction cable connected between said leg means and said stationary pulley, so that when said seat cushion is tipped up around said supporting shafts, said traction cable is synchronously pulled, whereby the leg means is folded and then laid on said bottom surface of said seat cushion against the action of said spring means.

15. A vehicle seat according to claim 14, further including means for causing said seat cushion to be automatically tipped up relative to said seat cushion, locking means for locking said seat cushion and preventing the tipping-up movement of said seat cushion, and releasing means for causing said seat cushion to be released from said locking means.

16. A vehicle seat according to claim 14, wherein said body floor of said vehicle has holding means mounted thereon, said leg means being adapted to be relesably engaged at a lower portion thereof with said holding means.

17. A vehicle seat according to claim 16, further including means for causing said seat cushion to be automatically tipped up relative to said seat cushion, locking means for locking said seat cushion and preventing the tipping-up movement of said seat cushion, and releasing means for causing said seat cushion to be released from said locking means.

18. A vehicle seat according to claim 14, further including a compensator for compensating a pulling force that is exerted on said traction cable.

19. A vehicle seat according to claim 18, further including means for causing said seat cushion to be automatically tipped up relative to said seat cushion, locking means for locking said seat cushion and preventing the tipping-up movement of said seat cushion, and releasing means for causing said seat cushion to be released from said locking means.

20. A vehicle seat according to claim 18, wherein said body floor of said vehicle has holding means mounted thereon, said leg means being adapted to be relesably engaged at a lower portion thereof with said holding means.

21. A vehicle seat according to claim 20, further including means for causing said seat cushion to be automatically tipped up relative to said seat cushion, locking means for locking said seat cushion and preventing the tipping-up movement of said seat cushion, and releasing means for causing said seat cushion to be released from said locking means.

22. A vehicle seat according to claim 1, further including spring means for biasing said leg means in such a direction as to be away from said bottom surface of said seat cushion, and means for causing said leg means to be operatively folded and then laid on said bottom surface of said seat cushion against an action of said spring means, synchronously with the tipping-up movement of said seat cushion relative to said seat back.

23. A vehicle seat according to claim 22, further including means for causing said seat cushion to be automatically tipped up relative to said seat cushion, locking means for locking said seat cushion and preventing the tipping-up movement of said seat cushion, and releasing means for causing said seat cushion to be released from said locking means.

24. A vehicle seat according to claim 22, wherein said body floor of said vehicle has holding means mounted thereon, said leg means being adapted to be relesably engaged at a lower portion thereof with said holding means.

25. A vehicle seat according to claim 11, further including means for causing said seat cushion to be automatically tipped up relative to said seat cushion, locking means for locking said seat cushion and preventing the tipping-up movement of said seat cushion, and releasing means for causing said seat cushion to be released from said locking means.

26. A vehicle seat according to claim 22, wherein said seat cushion is pivotally supported at both sides thereof to said seat back by means of a pair of supporting shafts, and said means for causing said leg means to be operatively folded and then laid on said bottom surface of said seat cushion against the action of said spring means comprises a stationary pulley mounted on one of said supporting shafts and fixed on one of said both sides of said seat cushion, and a traction cable connected between said leg means and said stationary pulley, so that when said seat cushion is tipped up around said supporting shafts, said traction cable is synchronously pulled, whereby the leg means is folded and then laid on said bottom surface of said seat cushion against the action of said spring means.

27. A vehicle seat according to claim 26, further including means for causing said seat cushion to be automatically tipped up relative to said seat cushion, locking means for locking said seat cushion and preventing the tipping-up movement of said seat cushion, and releasing means for causing said seat cushion to be released from said locking means.

28. A vehicle seat according to claim 26, wherein said body floor of said vehicle has holding means mounted thereon, said leg means being adapted to be relesably engaged at a lower portion thereof with said holding means.

29. A vehicle seat according to claim 28, further including means for causing said seat cushion to be automatically tipped up relative to said seat cushion, locking means for locking said seat cushion and preventing the tipping-up movement of said seat cushion, and releasing means for causing said seat cushion to be released from said locking means.

30. A vehicle seat according to claim 26, further including a compensator for compensating a pulling force that is exerted on said traction cable.

31. A vehicle seat according to claim 30, further including means for causing said seat cushion to be automatically tipped up relative to said seat cushion, locking means for locking said seat cushion and preventing the tipping-up movement of said seat cushion, and releasing means for causing said seat cushion to be released from said locking means.

32. A vehicle seat according to claim 30, wherein said body floor of said vehicle has holding means mounted thereon, said leg means being adapted to be relesably engaged at a lower portion thereof with said holding means.

33. A vehicle seat according to claim 32, further including means for causing said seat cushion to be automatically tipped up relative to said seat cushion, locking means for locking said seat cushion and preventing the tipping-up movement of said seat cushion, and releasing means for causing said seat cushion to be released from said locking means.

* * * * *